April 18, 1967
C. G. CURTIS ET AL
3,314,608
SUSPENSION SYSTEM ACTUATED SELF-PROPELLED
FLUID DISCHARGE DEVICE
Filed Feb. 8, 1965
4 Sheets-Sheet 1
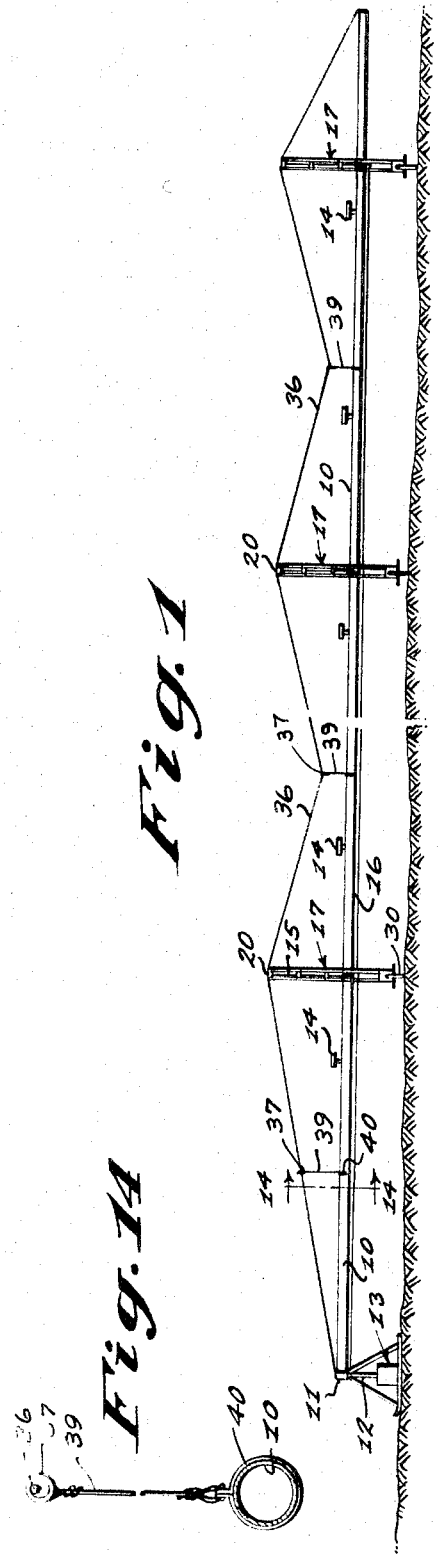
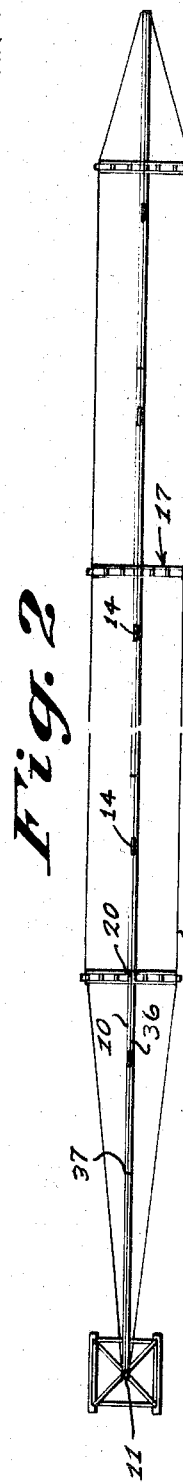
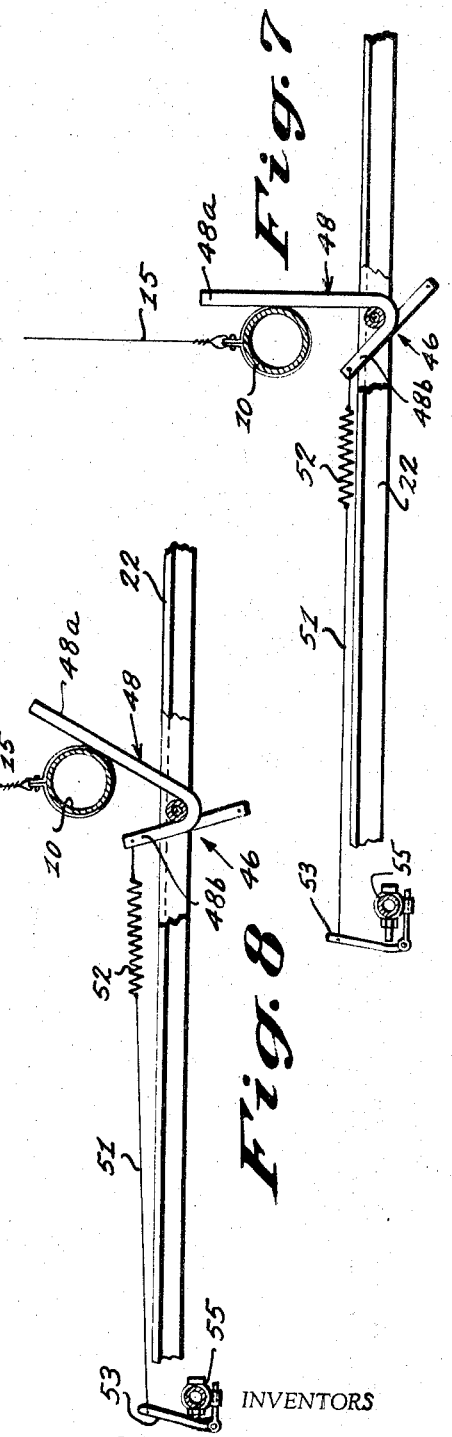
INVENTORS
CHARLES G. CURTIS &
BY PAUL C. JENNINGS
ATTORNEY

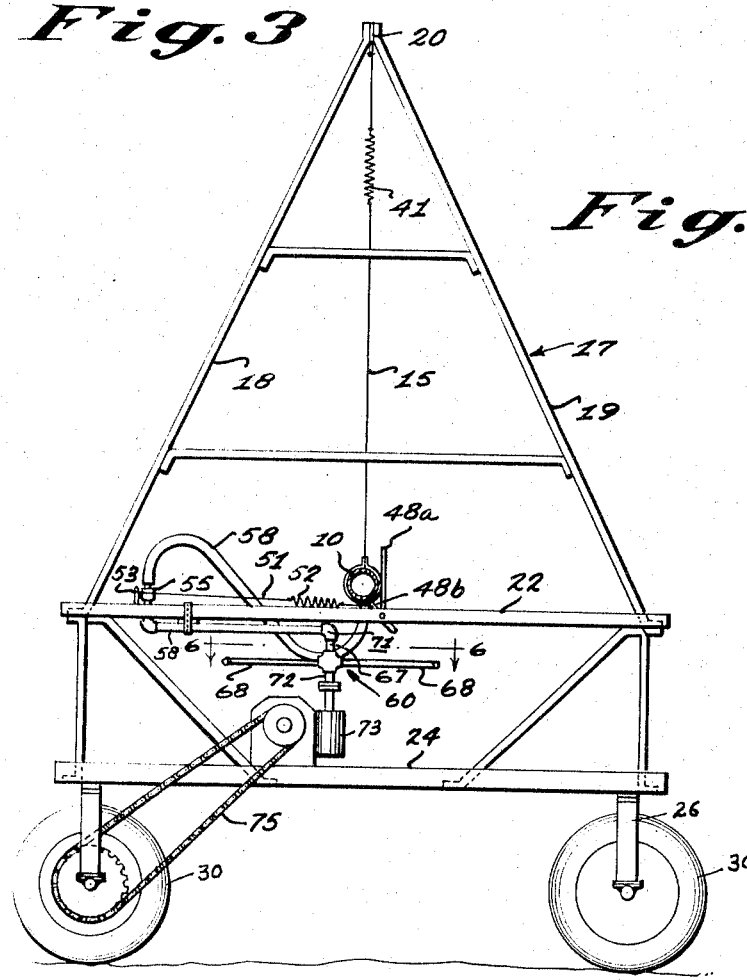
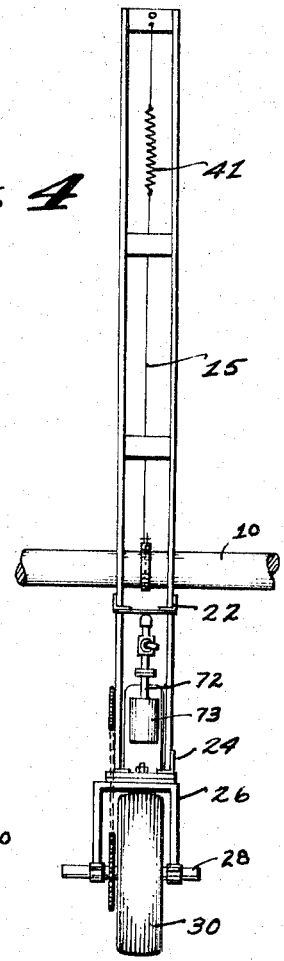
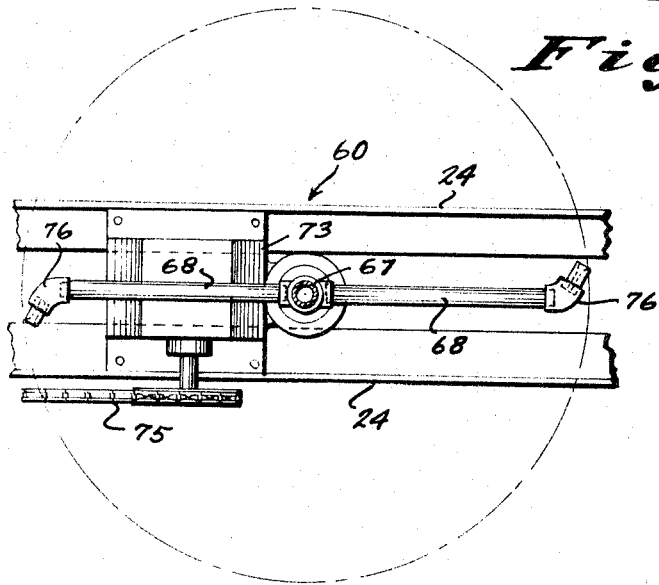
INVENTORS
CHARLES G. CURTIS &
BY PAUL C. JENNINGS
ATTORNEY

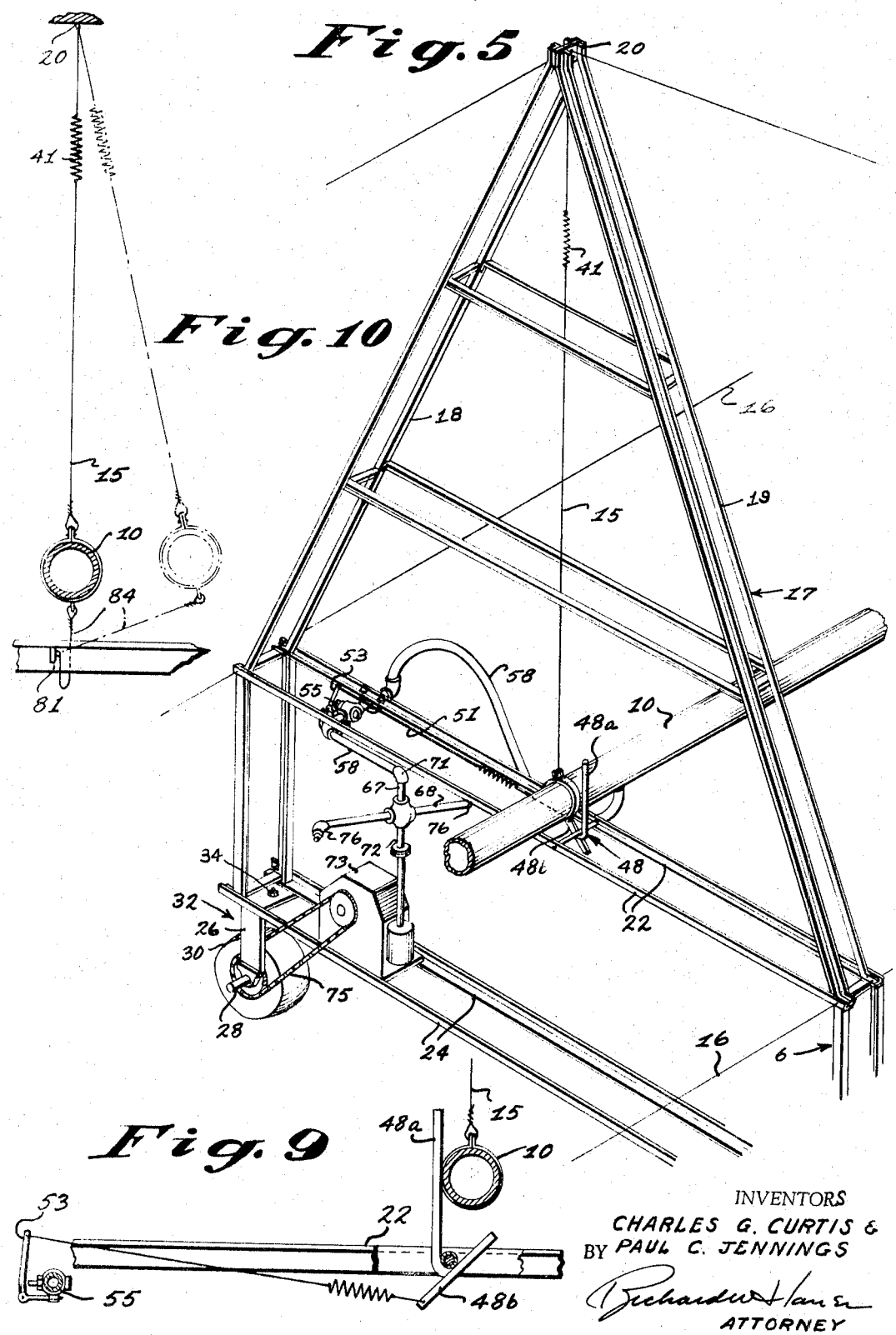

April 18, 1967 C. G. CURTIS ETAL 3,314,608
SUSPENSION SYSTEM ACTUATED SELF-PROPELLED
FLUID DISCHARGE DEVICE
Filed Feb. 8, 1965 4 Sheets-Sheet 4
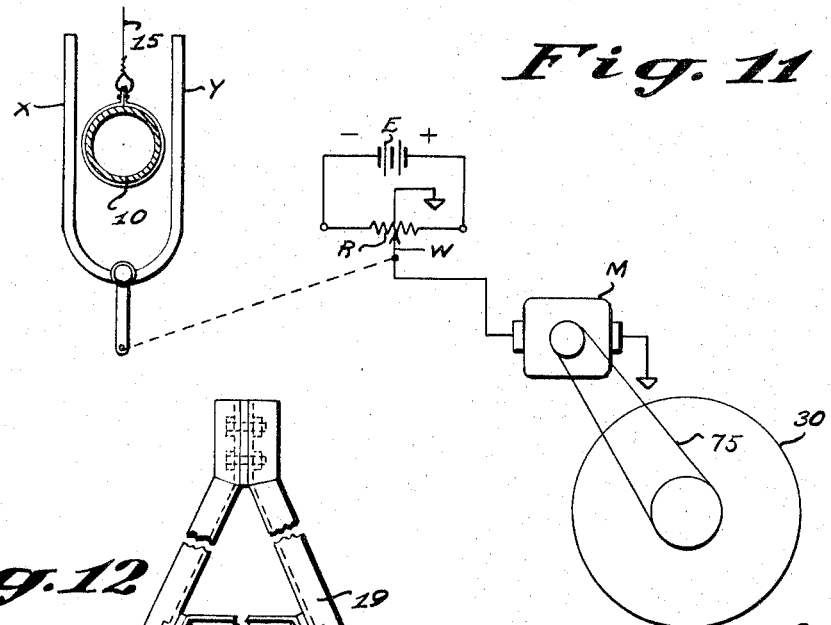
Fig. 11
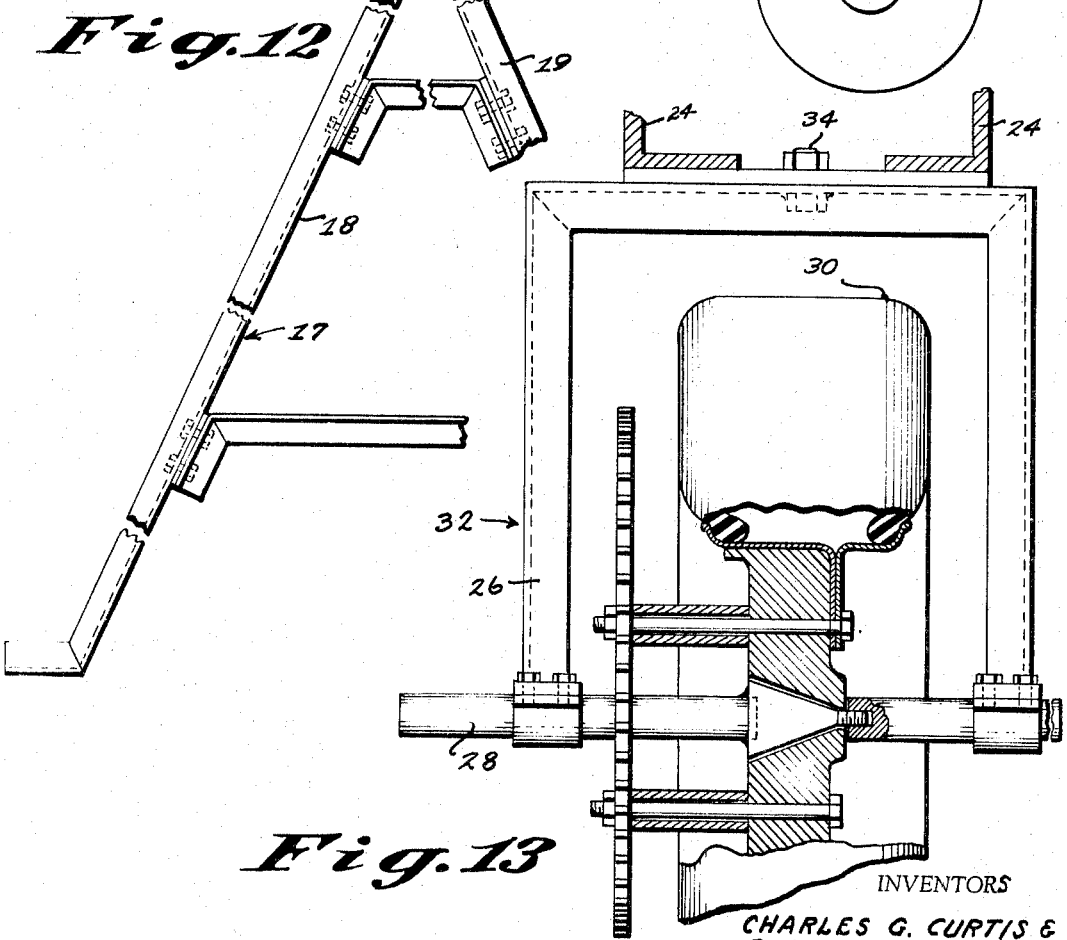
Fig. 12
Fig. 13
INVENTORS
CHARLES G. CURTIS &
BY PAUL C. JENNINGS
Richard Hauer
ATTORNEY

United States Patent Office 3,314,608
Patented Apr. 18, 1967

3,314,608
SUSPENSION SYSTEM ACTUATED SELF-PRO-PELLED FLUID DISCHARGE DEVICE
Charles G. Curtis, El Paso County, Colo. (Quarters 6602 1, Air Force Academy, Colo. 80840), and Paul C. Jennings, Los Angeles County, Calif.; said Jennings assignor of sixty percent to said Curtis
Filed Feb. 8, 1965, Ser. No. 430,857
21 Claims. (Cl. 239—177)

The present invention relates generally to fluid sprinkling and spraying apparatus of the type having a radius-forming elongated distributor swivelly attached at its inner end to a source of fluid and rotatable about the source in a manner such that its outer end describes a circle or portion thereof. More specifically, the invention pertains to improved means for intermittently supporting the distributor or supply pipe and for continuously moving the same circularly about its swivel point or in a direction perpendicular to its length.

Generally similar devices have seen considerable use in irrigating land where the fluid source is a water well in the center of the land area to be irrigated. Such systems employ an elongated pipe swiveled at one end to the well and have a plurality of wheeled supports therefor spaced along the length thereof, each support being provided with means for propelling itself over the terrain by power derived from the pressure of the water in the pipe. Although used with considerable success, the prior devices suffer from several disadvantages which encumber their usefulness and efficiency of operation, to say nothing of their high cost.

Basic to the concept of all such devices is the idea that the moving pipe line is maintained in a substantially true radial position by the incremental movement of each support derived from its individual response to a deviation from true radial alignment. The detection of the deviation and the provision of responsive apparatus to cause movement of each support has heretofore been the source of mechanical limitations and complexity which it is the object of the present invention to overcome.

Traditionally, the radially outermost support member is caused to move at a given rate and the interior supports are equipped with apparatus responsive to the resultant bending of the distributor pipe or the stressing of control wires strung from one support to another, wherein it is necessary that the pipe be firmly anchored to the support member. The mechanical complexity of this type of control is inherently costly and difficult to maintain. In addition, the fixity of the pipe creates problems particularly when the supports encounter uneven terrain. In the event that one support member passes over a topographic depression, the rigidity of the supply pipe may not allow the support member to follow the surface contour, but may instead hoist the support into the air above the ground, thus preventing traction and movement of that support and creating undue stress on the system which may result in permanent deformation or damage. Moreover, the fixed attachment of the distributor pipe to the support makes necessary or desirable the interposition of heavy coil springs in the cables which interconnect the plurality of supports and the supply pipe in order to provide some degree of flexibility to the system and to prevent undue stress on the pipe.

Other specific disadvantages of prior art structures involve the limitations imposed by the reciprocating piston type of water motor used to propel each support. Continuous rotary wheel motion is impossible to achieve, and the force applied by the motor piston to the drive mechanism is constant regardless of the grade being traversed by the support member. Moreover, the system is unidirectional, that is, it is limited to either clockwise or counter-clockwise movement about the water source. Still another difficulty lies in the fact that on the return stroke of the reciprocating piston the water contained in the cylinder is dumped onto the ground beneath the motor and in the path of the support wheels causing muddy and rutted conditions in the wake of each support. This affluence of water in a very localized area and the resultant erosion causes crop losses which have measured as much as four percent of a potato crop in a given field irrigated by the prior art devices.

It is these and other deficiencies of the prior art which it is the primary object of the present invention to overcome. More explicitly, it is a primary objective of the present invention to provide sprinkling and irrigating apparatus of the type described whose supply pipe or main distributor will be rigid and inflexible to such an extent that the sensitivity of response at each support to radial misalignment will be substantially increased and the continuity of alignment improved by thus utilizing the rigidity of the pipe as opposed to the prior dependency upon the springing or bending thereof.

Secondly, an objective of this invention is to provide the described apparatus with a novel means of attaching the distributor pipe to the intermittent supports wherein the pipe is hung in pendulum fashion from the apex of the supporting framework and whereby actual lateral dislocation of the pipe from a center position is influential in operating the means for motivating each support. It should be noted here that while pipe flexibility is not basically desirable because of its creation of a need for more supports, it is to a considerable extent necessary in the prior art in order to accommodate the deviation from alignment to which the motor means is responsive. The novel suspension of the pipe in the present apparatus not only assures smoother operation and greatly increased sensitivity but does so with a stiffer pipe, which is more desirable in the first place.

A further objective of the invention is to provide self propelled irrigating and spraying apparatus with continuous drive variable speed and torque water powered motors which will also serve as braking means when the support member encounters a down hill grade, and which will operate over a wide range of water pressures.

A still further object of the invention is to provide apparatus of the type described which may be easily adapted to move in either of two opposite directions, for example clockwise and counter-clockwise, and which can be simply converted to be towed in the direction of the distributor pipe length to move the rig from one location to another.

Another objective of the invention is to provide apparatus which is simple in its design and construction and economical to operate and maintain.

Other and still further objects, features and advantages of the invention will be in part apparent and in part pointed out specifically in the following written and pictorial description of a preferred form of the invention.

Succinctly stated, the invention in a broad sense contemplates a sprinkling and fluid discharge device having as its main element an elongated distributor conduit from the length of which fluid is discharged either continuously or at spaced intervals. The conduit is pendulously hung from a plurality of movable support members by flexible means such as a cable so that the conduit is free to move relative to the support members.

Thus, it is apparent that while the discussion herein pertains primarily to the species of such devices that are supported on the ground by wheels, the same inventive concept is ideally suited to ground or overhead supports such as tracks or rails which could carry the individual support member in whatever form they may be found to be most convenient.

For purposes of a detailed description of a preferred form of the invention, refer now to the accompanying drawings in which:

FIGURE 1 is an elevational view of the water distributing system of the present invention.

FIGURE 2 is a planned view thereof.

FIGURE 3 is a side view of a typical supporting frame.

FIGURE 4 is an end view of the supporting frame.

FIGURE 5 is a perspective view of a typical supporting frame showing a portion of the water distributing pipe of the drive structure for propelling the support frame.

FIGURE 6 is a cross sectional view taken along lines 6—6 of FIGURE 3.

FIGURE 7 is a fragmentary functional diagram of the distributor pipe and the motor actuator mechanism showing the pipe in its normal centered position.

FIGURE 8 is a view similar to FIGURE 6 except that the pipe is shown in a dislocated position wherein the actuator mechanism is operative to cause water flow through a control valve to the water motor.

FIGURE 9 is similar to FIGURE 6 except that the actuator arm is shown mounted on the opposite side of the distributor pipe to establish pipe travel in a direction opposite to that achieved by the mounting of FIGURE 6.

FIGURE 10 is the cross sectional view of the distributor pipe taken at a typical support frame, showing the functional relationship of the pipe to an emergency shut off switch.

FIGURE 11 is a functional and schematic diagram of a modified form of the actuator means and a simplified electrical circuit diagram of a servomechanism drive system for the support wheels.

FIGURE 12 is an end view of the angle iron construction of a typical support frame.

FIGURE 13 is an enlarged view of a typical wheel and its caster mounting with a portion thereof broken away and shown in cross section.

FIGURE 14 is a cross section taken along lines 14—14 of FIGURE 1.

A distributor pipe or conduit 10 is attached by an elbow joint 11 and a swivel connection to a cooperating conduit 12 at the source of water 13. Ideally, the distributor pipe 10 should be rigid enough to remain straight, but as a practical matter, pipe of the long lengths usually required for irrigation applications cannot be maintained perfectly rigid and inflexible. The pipe for apparatus according to this invention, however, can be as rigid and heavy as the load bearing and motive capabilities of the supporting structures can tolerate in order to improve the mechanical and structural integrity of the system, it being understood that stiffness of the pipe is desirable. Along its length, at convenient intervals, apertures are provided in the pipe for discharging water or other fluid onto the surface being treated. It is obvious without setting forth the details at length that nozzles 14 or other spraying appartaus can be attached to the pipe to permit sprinkling and spraying operations if desired.

Depending upon the length of pipe and its rigidity for the determination of the exact number of necessary supports, it can be said generally that the pipe 10 is suspended by a plurality of flexible cables 15 which are each attached at a fixed point to one of a plurality of periodically spaced movable supporting frames 17. Each of the said supporting members may be self-supporting structures having at least a three point contact with the ground or, more preferably, may be bi-wheeled for minimal encounter with crops or other ground cover. In either case, but in the latter case especially, means should be provided to stabilize the supporting frames and maintain them in their positions along the pipe relative to each other. For this purpose, guying wires or cables 16 interconnect the supporting frames 17 and the point of connection of the supply pipe to the water source 13.

Specific design of the supporting members is largely a matter of choice which varies with the specific use contemplated for the system; however, the A frame supports 17 illustrated in FIGURE 1 have proven satisfactory for most irrigating purposes. Each support comprises a pair of angularly inclined side members 18 and 19 forming an apex 20 along the vertical center line of the frame. Mutually parallel and horizontal cross bracing members 22 and 24 are secured between the sides 18 and 19 and are used as platforms on which to mount the actuator mechanism, soon to be described, and reaction motor gear box. Each of the lower corners of the frame 17 are provided with downwardly extending and pivotally mounted bifurcated yokes 26, the sides of which are employed as bearing members for the axles 28 of rotatable wheels 30 which are mounted thereon. Preferably, the wheel assembly is in the form of a lockable caster 32 having a locking pin 34 with which to lock the caster in any desired running position, that is in position for irrigating or with the wheel 30 parallel to the distributor 10. The latter expedient is particularly useful when it is desired to pull the system to a new locality by trailing the pipe 10 behind a tractor.

Referring once again to the support of the pipe 10, it will be noted by reference to FIGURE 1 that additional points of pipe suspension are provided approximately mid-way between each two adjacent supporting frames 17. A cable 36 is attached at each of its ends to the apexes 20 of adjacent frames 17 and is threaded through an open eye 37 which is connected to the upper end of a cable 39, attached at its lower end to a collar 40 embracing the between-frames mid-point of the pipe 10. Whenever one of the supporting frames 17 moves in a direction substantially perpendicular to the pipe 10 and carries the pipe with it, the pipe is free to move laterally with respect to the other support members. The pendulum support of the pipe permits the freedom of pipe movement necessary to overcome the problems associated with the passage of a support over the depressions and rises of uneven terrain. Preferably a spring 41 is inserted in series with the cable 15 to allow downward movement of the pipe 10 with respect to the support member 17, thus providing all degrees of freedom for the pipe.

As shown in FIGURE 7, a motor actuator 46 comprises a crank arm 48 pivotally attached to the brace 22 off its mid-point and having a substantially vertical portion 48a thereof extending upwardly a distance sufficient to engage the pipe 10 under all conditions of operation. A cable 51 and spring 52 connect the short arm 48b of the crank arm 48 to the operating lever 53 of a variable fluid valve 55 also secured to the brace 22. In operation, as shown in FIGURE 8, lateral movement of the pipe 10 causes pivotal motion of the crank arm 48 and consequent opening of the valve 55. Greater degrees of pivotal movement of the crank arm 48 will cause opening of the valve 55, allowing more water to pass from the supply pipe 10 through the flexible hose 58 and into the reaction motor 60. In apparatus equipped with a reaction fluid motor, as hereinafter described, the system may be made to move in the opposite direction by remounting the actuator crank arm 48 on the opposite side of the pipe and changing the point of leverage connection between the cable 51 and short arm 48b, as shown in FIGURE 9.

In one form of the invention, it is contemplated that the drive means for each support frame shall comprise a reversible direction motor or two motors, one for each direction of travel. In such an embodiment, an actuator assembly as shown in FIGURE 11 could provide a closed loop servomechanism type control for each support frame, thus providing tighter control of each support. An electric motor drive system is depicted in FIGURE 11 wherein the opposing crank arms X and Y move the wiper W of a rheostat R connected to a voltage source E. By supplying either the positive or negative voltage to the motor M, the direction of rotation is determined. By well known servomechanism principles, the pipe 10 is maintained in a substantial central location with respect to the support frame.

Returning to the concept of a single reaction type water motor, as illustrated in the drawings of the preferred form of the invention, reference is made to FIGURES 3 and 6 where the motor is shown generally by reference numeral 60. A tubular spindle 67 having diametric tubular arms 68 is journaled for rotation in an elbow joint 71, which terminates the pipe line 58 from the output of the valve 55. An output shaft 72 perpendicular to the arms 68 and aligned with the spindle 67 connects the rotating motor arms with a speed reducing gear train contained in a housing 73. The output of the gear train is operatively connected to drive one of the wheels 30 by a drive chain 75. Reaction nozzles 76 are advantageously applied to the ends of the motor arms 68 to increase the reaction drive force and to sprinkle the water which hase been used in the motor over the ground. For reversing the direction of travel of the pipe 10, the reaction nozzles 76 can be rotated 180° to reverse the direction of motor rotation.

Several distinct advantages accrue from the use of a motor such as the one just described. First, the torque may be varied by employing reaction arms of different lengths and nozzles of varying apertures. Second, since the torque output of a rotating member is inversely proportional to its speed, a variable torque motor is provided when inclined grades are encountered by the support frame and the motor is slowed down by the increased load. Further, the speed of the motor 60 is easily controlled by the rate flow of water passed by the valve 55. The rotating output of the motor 60, as contrasted to a reciprocating motor output permits the use of rotating speed reduction gearing such as that already described in connection with the present apparatus. Preferably, the reaction motor 60 is designed for relatively high speed operation and the gear train for a high reduction ratio. Consequently, the gear train is difficult to rotate from its output side and operates as a downhill brake for the drive wheel 30 which is connected to the gear train output. A still further advantage is the fact that the reaction motor will operate satisfactorily on relatively low water pressures, thus reducing the power requirements for the pump supplying the well water.

Practical usage of a system of the type just described may require pipe lengths of 1500 feet or more. The number of supporting frames and their spacing must depend upon the total pipe length, the pipe specifications, and the terrain for which the system is intended to be used. In all instances, the outermost support frame controls the speed of movement of the system with the motor actuator valve 55 associated with the outer support set to deliver a given water flow to the reaction motor. As the outer support moves over the ground and carries the free outer end of the pipe 10 with it, the pipe swivels about its axis at the source and is thereby slightly displaced from its normal center position with respect to the several supporting frames 17. Such lateral dislocation of the pipe 10 at each support location causes the pipe to make contact with the respective valve actuator crank arms 48a and force the control valves 55 to open by tension on the connecting cables 51. Opening of the valve 55 causes water to be diverted to the reaction motor 60 whose drive output causes forward movement of the supporting frame 17. Forward motion of the support then tends to re-center the pipe 10 and deactuate the motor. Simultaneous movement proceeds continuously at all of the several supporting towers and results in the progressive transport of thew hole length of pipe across a field and the even irrigation of the ground over and around which the pipe passes.

When, during transverse travel of the pipe, as just described, hills or depressions are encountered by one of the support members 17, the suspension system of the distributor pipe 10 permits the support to rise, fall or tilt with respect to the pipe without producing undue stress thereon. For example, if the frame 17 rolls into a hollow or low spot in the terrain, the suspension cable 15 associated with that particular frame will become slack, eliminating the possibility of the frame being carried by the pipe. In passing over a section of higher ground, the frame 17 will tend to lift a portion of the distributor pipe 10, however, the spring 41 in series with the pendulum cable 15 absorbs some of the increased cable tension and the pipe lift is less than the rise of the support frame. In addition, the fact that the pipe may be lifted with respect to the two or more frames adjacent to the one or more supports passing over high ground emphasizes the total flexibility of the suspension system.

Nothwithstanding the accuracy of design and conception of the system, occasions may arise where one or more supporting frames fail to maintain reasonable alignment and rupture of the pipe 10 is imminent. For emergencies of this kind, each support frame 17 is provided with a normally closed electric switch 81 through which electric current passes to operate the water pump in the well. A cord 84 is attached to the pipe 10 and the contacts of the switch 81 and acts to open the switch in the event that the pipe 10 exceeds a predetermined limit of dislocation in either direction from its center position.

Having thus described the several useful and novel features of the irrigating device of the present invention in connection with the accompanying drawings, it will be seen that the many worthwhile objectives for which it was designed have been achieved. Although but a few of the several possible embodiments of the invention have been illustrated and described here, we realize that certain additional modifications may well occur to those skilled in the art within the broad teaching hereof; hence, it is my intention that the scope of protection afforded hereby shall be limited only insofar as said limitations are expressly set forth in the appended claims.

We claim:

1. In self propelled overhead irrigation apparatus which includes a plurality of spaced movable support members arranged in a line, a water supply conduit carried by the supports and having means connected to one end of said conduit for pivotal connection to a water source, the improvement comprising:
   a pendulum member attached to each of said supports and connected at its free end to the supply conduit to permit free movement of the conduit with respect to said supports; and
   drive means operatively connected to each of at least two supports.

2. A sprinkling and fluid discharge device comprising:
   a distributor conduit having a plurality of spaced fluid discharge means;
   a plurality of movable supporting means;
   a plurality of flexible hanger means suspending said conduit at spaced intervals from a fixed point on each of said supporting means whereby the conduit is free to move relative to the supporting means;
   drive means operatively attached to each of the support means for moving the same; and
   means responsive to the said movement of the conduit relative to the support means and coupled to the drive means for actuating said drive means.

3. In sprinkling and irrigation apparatus for relatively large areas of land which includes a water source, an elongated movable water supply conduit connected to the source, at least three movable support members disposed at spaced intervals along said conduit, said support members having drive means including a wheel, the improvement comprising:
   cable means attached to each support member pendulously suspending the said conduit from each of said support members so that the water supply conduit is free to move with respect to said support, said movement actuating said drive means.

4. The combination of claim 3 wherein the cable means includes a tension spring member.

5. The combination of claim 3 and further including:
   a rotatable fluid motor having an output;
   actuator means operatively connected to the motor and responsive to transverse movement of the said conduit; and
   means operatively interconnecting the said motor output and the wheel.

6. The combination of claim 3 wherein said drive means includes:
   at least one drive wheel;
   a rotatable fluid motor having an output;
   gear means operatively interconnecting the said motor output and the drive wheel.

7. A suspension system for a self propelled fluid discharge device having an elongated supply conduit comprising:
   a plurality of spaced apart movable support means;
   a like plurality of pendulum hanger means attached to the supply conduit at intervals and suspending the conduit from the support means for free movement relative thereto;
   an elongated tension member disposed above the conduit and running parallel therewith and secured to each of said support means; and
   second flexible hanger means attached to the conduit at points substantially equi-distant from two adjacent ones of the said support means and suspending said conduit from the tension member.

8. The system of claim 7 wherein the second hanger means is slidable upon the tension member.

9. The system of claim 7 wherein the said hanger means are elastic under tension.

10. Sprinkling and irrigating apparatus comprising:
    an elongated distributor;
    a plurality of spaced apart support means movably supporting said distributor, whereby the distributor is free to move transversely of itself with respect to said support means;
    drive means including a motor operatively connected to the support means; and
    means responsive to said transverse movement of the distributor with respect to the support means and connected to the said motor for actuating the same.

11. The apparatus of claim 10 wherein the responsive means includes:
    a crank arm pivotally attached to the support means and whose pivotal axis is substantially parallel to the longitudinal axis of the distributor and said crank arm being in close proximity to the said distributor;
    motor input control means; and
    linkage means interconnecting the said crank arm and motor input control means.

12. The apparatus of claim 11 wherein the motor includes:
    a rotatable output shaft;
    a pair of diametrically disposed fluid carrying conduits arranged perpendicularly to the axis of the output shaft and attached thereto;
    nozzle means connected to the outer ends of the said conduits; and
    wherein the motor input control means is a variable fluid control valve having conduit means interconnecting the valve with the distributor and with the diametrically disposed conduits.

13. The apparatus of claim 10 wherein the responsive means includes:
    a yoke pivotally mounted to the support means and whose pivotal axis is substantially parallel to the longitudinal axis of the distributor and wherein the distributor is positioned between the sides of the yoke;
    position feedback means;
    means mechanically interlinking the yoke with the feedback means; and
    means electrically interconnecting the feedback means and the motor.

14. In self propelled overhead irrigation apparatus which includes a plurality of spaced movable support members arranged in a line, a water supply conduit carried by the supports and having means connected to one end of said conduit for connection to a water source, the improvement comprising:
    drive means operatively connected to each of at least two supports, said drive means including,
    at least one drive wheel rotatably mounted on said supports,
    a rotatable fluid powered motor having motor fluid conduit means interconnecting said motor and said water supply conduit,
    control means responsive to misalignment of said movable support members caused by movement of at least one of said supports and operative on said reaction motor to start and stop said motor, and
    a speed reduction gear train interconnecting the output of the reaction motor and the said drive wheel.

15. The combination of claim 14 where said control means includes a valve disposed in series with said motor fluid conduit means.

16. In self propelled overhead irrigation apparatus which includes a plurality of spaced movable support members arranged in a line, a water supply conduit carried by the supports and having means connected to one end of said conduit for connection to a water source, the improvement comprising:
    a pendulum member attached to each of said supports and connected at its free end to the supply conduit,
    drive means operatively connected to each of at least two supports, said drive means including,
    at least one drive wheel rotatably mounted on said supports,
    a rotatable fluid powered motor having motor fluid conduit means interconnecting said motor and said water supply conduit,
    control means responsive to misalignment of said movable support members caused by movement of at least one of said supports and operative on said reaction motor to start and stop said motor, and
    a speed reduction gear train interconnecting the output of the reaction motor and the said drive wheel.

17. The combination of claim 16 where the pendulum member is a flexible cable.

18. In sprinkling and irrigating apparatus for relatively large areas of land which includes a water source, an elongated pivotally movable water supply conduit connected to the water source, a plurality of movable support members arranged in a line and disposed at spaced intervals along said conduit, said support members having drive means including a wheel, the improvement comprising:
    a rotatable fluid motor having an output;
    actuator means operatively connected to the motor and responsive to misalignment of said support members caused by the movement of at least one of the support members; and
    means operatively interconnecting the said motor output and the wheel.

19. The combination of claim 18 and further including:
    means attached to each support member pendulously suspending the said conduit, from each of said support members so that the water supply conduit is free to move with respect to the said support.

20. A self-propelled sprinkling and irrigating device comprising:
    an elongated fluid carrying conduit having means for releasing the fluid therefrom;
    a coupling interconnecting one end of the conduit with a source of fluid;

support means circumscribed about said conduit at spaced intervals and having traction means rotatably attached to the lower extremities of said supporting means;

means attached to the conduit and suspending the conduit for free lateral movement from a fixed point on each of said support means;

a fluid valve;

actuator means carried by the support means and operatively connected to the valve and responsive to lateral movement of the conduit to actuate the valve;

a fluid motor having a rotatable output;

fluid carrying means interconnecting the said conduit and the valve and the fluid motor; and coupling means operatively interconnecting the rotatable output of the fluid motor and the said traction means whereby the traction means are driven by the said motor output.

21. In self propelled sprinkling and irrigation apparatus including:

a distributor pipe movable along a path substantially transverse to its length;

means for supplying water to the distributing pipe;

a plurality of supports disposed along the length of the distributing pipe;

a plurality of discharge means spaced along the distributing pipe for spraying water onto the land;

drive means carried by each support and operatively connected thereto;

control means carried by each intermediate support and adapted to cause said drive means to move the support in response to its position with respect to adjacent intermediate supports;

control means for said drive means at the outermost of said supports for causing the associated drive means to operate continuously;

the improvement comprising;

an electric switch having an actuator mounted on each of said supports;

a flexible member of predetermined length interconnecting the actuator of the switch and the said distributing pipe; and electrical means interconnecting said switch and the said means for supplying water to the distributing pipe, whereby tension on the flexible member will actuate the switch and terminate the water supply.

References Cited by the Examiner

UNITED STATES PATENTS

| | | | |
|---|---|---|---|
| 1,321,350 | 11/1919 | Alvarez | 239—212 X |
| 1,632,353 | 6/1927 | Todd et al. | 239—177 |
| 2,222,497 | 11/1940 | Bins | 138—107 |
| 2,604,359 | 7/1952 | Zybach | 239—177 |
| 2,889,948 | 6/1959 | Leuenberger | 239—212 X |
| 2,941,727 | 6/1960 | Zybach | 239—212 X |
| 3,001,721 | 9/1961 | Zybach | 239—177 |
| 3,259,319 | 7/1966 | Wallace | 239—177 |

FOREIGN PATENTS 123,987   2/1949   Sweden.

M. HENSON WOOD, JR., *Primary Examiner.*

VAN C. WILKS, *Assistant Examiner.*